United States Patent [19]

Schulze et al.

[11] Patent Number: 5,746,848
[45] Date of Patent: May 5, 1998

[54] PROFILED VEHICLE TIRE AND METHOD FOR DIMENSIONING THE OPTIMUM PHASE OFFSET BETWEEN ADJACENT TREAD PORTIONS

[75] Inventors: Thomas Schulze, Hanover; Geert Roik, Cremlingen; Michael Hahn, Hanover; Klaus Kleinhoff, Rodenberg, all of Germany

[73] Assignee: Continental Aktiengesellschaft, Hanover, Germany

[21] Appl. No.: 313,891

[22] Filed: Sep. 27, 1994

[30] Foreign Application Priority Data

Sep. 27, 1993 [DE] Germany .................. 43 32 811.3

[51] Int. Cl.[6] .................................................. B60C 113/00
[52] U.S. Cl. ............................ 152/209 R; 156/110.1
[58] Field of Search .................. 152/209 R, 209 D; 156/110.1

[56] References Cited

U.S. PATENT DOCUMENTS

| 3,094,157 | 6/1963 | Klohn | 152/209 R |
| 4,178,199 | 12/1979 | Lippman et al. | 152/209 R |
| 4,936,364 | 6/1990 | Kajiwara et al. | 152/209 R |
| 5,309,965 | 5/1994 | Williams | 152/209 R |

FOREIGN PATENT DOCUMENTS

| 378741 | 2/1985 | Austria . | |
| 114594 | 8/1984 | European Pat. Off. | 152/209 R |
| 114594 | 4/1989 | European Pat. Off. | 152/209 R |
| 2713286 | 10/1977 | Germany . | |
| 2912608 | 10/1979 | Germany . | |
| 3218219 | 11/1983 | Germany . | |
| 4026486 | 2/1992 | Germany . | |
| 255202 | 11/1987 | Japan . | |
| 279902 | 11/1988 | Japan | 152/209 D |
| 178005 | 7/1989 | Japan | 152/209 D |

*Primary Examiner*—Steven D. Maki
*Attorney, Agent, or Firm*—Robert W. Becker & Associates

[57] ABSTRACT

A vehicle tire having a profiled tread on the periphery of which are arranged pitches of at least two different lengths. In an axial direction, the tread is divided into several parts, with the successive pitch length in a given axial part forming a pitch sequence. To further reduce radial force fluctuations that induce vibrations by the transmission of noise into wheel suspension and body parts, the phase offset between the pitch sequences of the various tread parts is dimensioned such that the distance between the absolute extremes of the summation of weighted representations of a given function is minimal or at most 25% greater than this minimum. Each of the tread parts have associated therewith a function that is the successive plotting of successive pitch lengths of the pertaining tread part on the abscissa while marking off the respective pitch length, starting from the abscissa, onto the ordinate. From each of these functions a "representation" is determined that is what remains after elimination of all harmonic parts of greater than the x order, with "x" being an integer between 8 and 14. To determine this remainder, the function is first harmonically analyzed from the first to the x order, and from this information, including the phase information, the representation is generated by synthesis.

10 Claims, 8 Drawing Sheets

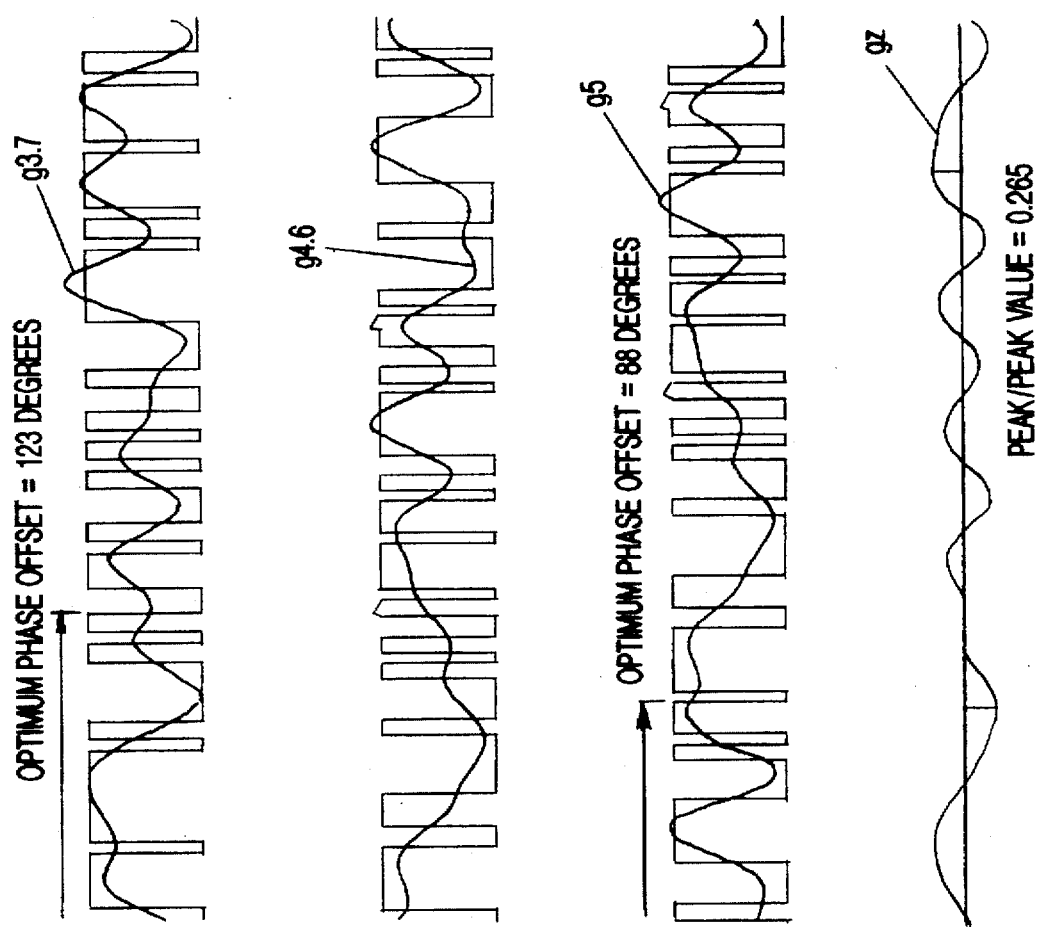

PROFILED VEHICLE TIRE AND METHOD FOR DIMENSIONING THE OPTIMUM PHASE OFFSET BETWEEN ADJACENT TREAD PORTIONS

BACKGROUND OF THE INVENTION

The present invention relates to a vehicle tire having a profiled tread on the periphery of which are arranged design cycles or pitches of at least two different lengths, whereby when viewed in an axial direction of the tire, the tread is divided into several parts, and the successive pitch lengths in each of the axial parts forms a pitch sequence.

Proposals have been made to divide the tread into a left half and a right half and despite the same profile pattern (in the definition of DE-OS 41 36 226.8, see page 2, line 50—page 3, line 6) to provide different pitch sequences. These pitch sequences can also differ from one another in the number of pitches.

With the known proposals, each tread part contributes to approximately one half of the overall noise that is generated; however, by avoiding coherence partial cancellation is supposed to result, and in addition the frequency spectrum should even more greatly approximate a background noise, which at the same noise attainment is perceived as less disturbing over a longer exposure time than a total noise, in other words, a noise the noise attainment of which is essentially concentrated at frequencies that have an integral relationship to a fundamental frequency.

Thus, the object of the present invention is not to be concerned primarily with a further improvement of the noises emitted from the tire and from the contact between the tire and road surfaces, but rather to further reduce the radial force fluctuations that by the transmission of noise through bodies can induce vibrations in wheel suspension and vehicle body parts.

BRIEF DESCRIPTION OF THE DRAWINGS

This object, and other objects and advantages of the present invention, will appear more clearly from the following specification in conjunction with the accompanying schematic drawings, in which:

FIG. 8 shows the superimposition similar to FIG. 7, yet with the inventively optimum phase offset.

SUMMARY OF THE INVENTION

Figure 1A:
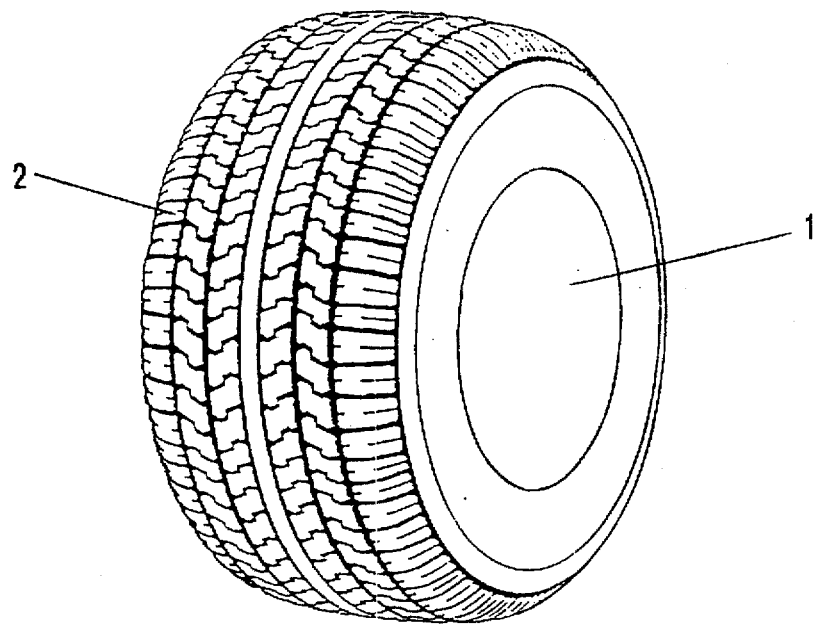
FIG. 1a is a perspective view of a vehicle tire divided into two tread halves.

The present invention is characterized primarily in that the phase offset between the pitch sequences of the various tread parts is dimensioned or specified such that the distance between the absolute extremes of the sums of the weighted representations of a given subsequently defined function is minimal or at the most 25% greater than this minimum. In this connection, for each tread portion there is determined a function that is the successive plotting of successive pitches (p1, p2, . . . pn, where n is the number of pitches) of the pertaining tread part on the abscissa while marking off the respective pitch length, starting from the abscissa, onto the ordinate. From each of these functions, a "representation" is determined that for one skilled in the art can be most easily defined as a remaining function after elimination of all harmonic parts of greater than the "x" order, with "x" being a whole number an integer between 8 and 14.

As is known, every periodic signal, in other words also the above defined functions, can be restructured in such a way that the signal is initially analyzed entirely harmonically ("entirely" is intended to mean up to the highest order that actually occurs in the signal, in other words generally unlimited) and with the thus obtained information relative to the amplitude and phase relationship of one of each harmonic is again synthesized to a signal. The thus obtained signal is identical to the starting signal; thus, analysis and synthesis could also be perceived as operations that are inverse to one another with the identical representation as the neutral element.

The important thing in determining the inventive phase offset angle is that the analysis is effected only incompletely, namely from the first to the x order, with "x" being an integer between 8 and 14, preferably 9 and 11. By means of this curtailment of the analysis, the subsequent synthesis no longer leads back to the starting signal.

The combination of these two operations will be designated as representation within the context of the instant application.

Although it is quite customary during the dimensioning of pitch sequences to establish a Fourier analysis and to curtail prior to further processing, in so doing however it is customary to excise the phase information and to take account of the amplitude information at least up to much greater orders. To optimize the noise, the present invention is concerned particularly with amplitudes from about the 50th to the 110th order. A particular feature of the computing process presented here is that analysis is effected to only about the tenth order and within these limitations the phase information is not excised.

The term "analysis" (more completely: Fourier analysis or harmonic analysis) has a double meaning, namely not only the process of the analysis but also the result of the analysis, in other words a data set. A similar situation exists for the terms "synthesis" and "representation". Nonetheless, this does not involve any uncertainty because it is always clear from the context what is meant; in particular, in conjunction with the verb "be" the respective result is met.

To establish the weighting or importance factors, the sum of the weighting factors should be 1. In the simplest case, in which the tire is divided into a left half and a right half, with both halves being symmetrical to the center of the tire, with the exception of the phase offset that is to be determined by the present invention, and with both tire halves having the same pitch sequence and with the camber and the toe in of the wheel suspension that is to be optimized both being zero, in other words the load-carrying proportion of each of the tire halves relative to the entire load of the tire is the same, namely ½, the two weight factors are: ½.

If such a tire is subjected to camber, the tire half that faces inwardly relative to the vehicle bears somewhat more load than does the outer tire half, which for a perfect coordination of a tire to a vehicle would allow for a somewhat greater weighting factor for the inner tire half, for example 0.52 to 0.48. However, this refinement has application only in the rare case in which the sum of all of the representations produces two nearly equally small relative minimals, in other words, a mistaken substitution in the selection of the smallest relative minimum could occur; however, even then the value (in other words the achieved peak/peak value, not the pertaining phase angle) of the smallest relative minimum is practically unchanged. With a view toward this negligible significance and the prevailing market requirement to be able to use a tire at all wheel positions and even more importantly on a number of vehicle types, for the sake of simplicity the camber will be assumed to be zero subsequently, at least for non-side bound tire types. The same applies for the toe in.

A particularly important situation in practice is where the tire profile is not divided into a left half and a right half (as in the embodiment of FIG. 1), but rather is divided, when viewed onto the tire surface, into an axially outer and an axially inner region. These preferred embodiments nearly entirely avoid the generation of torque about the vertical axis of the wheel during a rolling motion. Although the contact of a particularly stiff positive region with the roadway leads not only to an increase of the wheel load proportion but also of the resistance to rolling proportion, which especially in the outermost positive row due to the greater lever arm that is present there to the steering wheel is of concern to the wheel in just this direction, the same thing takes place on the other side of the tire, so that the two effects to a large extent compensate one another. As a result, the steering wheel, even at high speeds, remains particularly still.

In the event that the outer positive rows have the same load-carrying proportion as do the inner rows, and have the same number of pitches, the same transverse groove depth, and the same transverse groove orientation, here also the two tread regions, or more precisely their representations, are to be weighted ½.

However, as is the case with a few types of tires, the transverse groove depth in the inner positive row is greater than in the shoulder rows, in other words the rigidity of the tread strip fluctuates greater in this region over the periphery, the correct weighting factor of the representation of the inner rows is correspondingly greater and that of the outer is less. How much the fluctuation of the rigidity is increased with respect to increasing transverse groove depth is quickly known to one skilled in the art after carrying out a finite element program that describes the pertaining tread parts. A similar but reverse situation is true where the transverse groove depth in the shoulder rows is greater than in the inner rows.

In many tire types the inner positive rows assume a greater portion of the tire width than do the outer rows, so that the load-carrying proportion of the inner rows is greater than that of the outer rows. In such cases, the weighting factor of the representation of the inner rows is appropriately larger and the weighting factor of the representation of the outer rows is appropriately smaller. In particular, the weighting factors of the individual representations are proportional to the product of the respective load-carrying proportion times the axial extension of these transverse grooves, or times the cosine of the angle of inclination of the transfer grooves relative to the circumferential direction of the tire, in the associated positive rows.

With some tires, especially those having arrow-shaped profiles, the transverse grooves do not extend to the zenith; however, a circumferential rib that is not divided by transverse grooves runs evenly on a roadway that is assumed to be smooth. Assuming 6% of the entire tire width taken up by the inner positive rows does not have transverse grooves passing therethrough, the weighting factor of the inner rows is accordingly to be reduced (i.e. by about 3%), and the weighting factor of the outer rows is accordingly increased.

Furthermore, with certain types of tires the angle of inclination of the transverse grooves varies over the width of the tire. However, an exactly transversely extending groove ($\beta=90°$) reduces the local resistance to bending of the tread strip to a greater extent than does a diagonally extending groove at the same groove width. Very precise determinations to this problem can be generated by the finite element methods that are familiar to one skilled in the art; in the range of nearly axially extending transverse grooves ($\beta$ is between 70° and 110°) this dependence can be sufficiently precisely taken into account by introducing the factor cos ($\beta$).

As is customary, the inventive disclosure provides a tolerance range for the optimum conditions in order not to unduly restrict the application of the inventive teaching. Such a range is furthermore justified in the present situation in that the objective of suppressing vibration (lower frequency range) is less important than the other objective of lower direct noise radiation from the tires and the contact surfaces thereof to the roadway, especially the subjective valuation or weighting thereof. The distance between the absolute extremes of the sum of the representations of the functions of the tread portions is preferably at most 10% greater than the minimum that can be achieved. This results in a particularly significant reduction of the radial force fluctuation with nonetheless sufficient freedom for a fine tuning of the phase offset with a view toward the subjective noise.

Furthermore, a tolerance range is also expedient for the reason that the position of the relative minimal and of the absolute minimum vary due to variation of the "x". The representation sum is preferably determined not only for a single "x" but rather for all three, preferred, values x=9, x=10 and x=11, with these being superimposed and the absolute minimum being sought therefrom.

Generally in all three individual representation sums the relative minimum approaches the smallness of the respective absolute minimum, generally being barely 10% greater.

The inventive teaching is based on the recognition that a greater portion of the radial force fluctuations that are to be overcome are caused by the variations of the block lengths: A region of greater block lengths flattens with greater resistance when contacting the roadway than does a region of shorter block lengths. In conformity with the greater bending resistance, the transferred radial force at constant distance between the axis of rotation and the roadway or test drum thus increases when a tread portion of greater block lengths makes contact with the roadway and drops in the reverse manner when a tread portion having shorter block lengths makes contact with the roadway.

The thus caused radial force fluctuation (RFF) is even greater the greater is the profiled depth, hardness of the tread, and the maximum pitch length relationship, and is even smaller the greater is the tread radius and the air pressure. Whereas radial force fluctuations have up till now been blamed on irregularities such as joints or seams in the carcass and the belt, the inventors of the present invention have recognized that the pitch sequence can also have a significant effect; since RFF increases along with air pressure due to irregularities in the substructure, it is possible to assess pursuant to the recognition of the inventors which of the influences predominates by comparison of the RFF trace at different air pressures, even on individual tires.

Unlike the initially described state of the art, the present invention permits the use of the same pitch sequence in the same direction of rotation in all of the tread parts. This makes it possible to have a transverse groove configuration that is continuous over the entire width of the tire, which is particularly advantageous with respect to the aquaplaning characteristic.

Although it is adequate in most cases to divide the tread into two axially adjacent parts and to calculate the optimum phase offset thereof, an even more refined elimination of the radial force fluctuations is possible by dividing the tread into a greater number of adjacent parts; the weighting or importance of the representation of a given tread part is then correspondingly smaller.

For the first iteration step it is sufficient to vary the phase offset in 20 steps. Thus, for a first general view of the position of the relative minimals 180 calculations are already sufficient; in the preferred special case where both of the pitch sequences that are offset relative to one another are identical, 90 calculations are even sufficient because the diagram of the spacing of the absolute extremes (i.e. peak/peak value) plotted against the phase offset must be symmetrical relative to the 1800 line. If the tread is divided into three parts, two optimum phase offsets (two dimensional vibration problem) must be determined, for which purpose the calculation effort must be squared. Similarly, the above described calculation effort is raised to the third power if the tread is divided into four parts (three dimensional vibration problem); even this type of effort can be carried out in under five minutes with today's computers.

Especially to suppress steering wheel wobbling at high speeds, it is advisable to maintain a symmetry of the tread profiling relative to the central plane of the tire; this is easily possible with arrow-shaped profiling, and is illustrated in the embodiment of FIGS. 5 to 8.

Further specific features of the present invention will be described in detail subsequently.

DESCRIPTION OF PREFERRED EMBODIMENTS

Referring now to the drawings in detail, the invention will first be described in detail with the aid of the first, particularly simple exemplary embodiment depicted in FIGS. 1 to 4. This embodiment is based on a single, and in particular intentionally poor, pitch sequence in order in this way to be able to show particularly clearly how much for the smallness of the radial force fluctuations can nonetheless be gained with the present invention. The pitch sequence is as follows: 11221211112121211121111222212122212222121111222122 2212111111212

The smaller pitch length, the 11111, is as customary normalized to 1.000, and the only other pitch length, the "2", is 1.56.

Figure 1B:
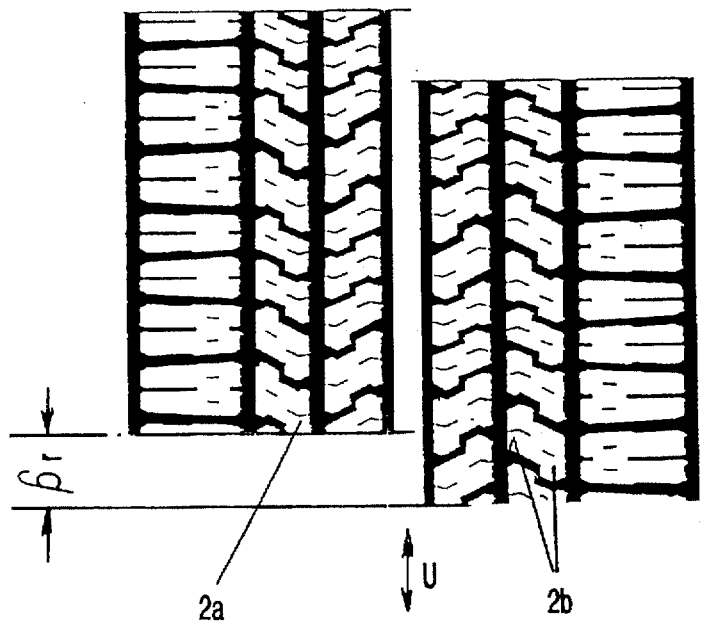
FIG. 1b shows a portion of the tread profile progression, whereby the two tread halves are offset in a circumferential direction relative to one another.

The perspective view of FIG. 1a shows a vehicle tire 1, the tread 2 of which can be divided into two halves 2a and 2b. FIG. 1b shows a portion of the profile progression of this tire, with the two tread halves 2a and 2b being offset or staggered relative to one another in the circumferential direction U by an arc length of β x r, where "r" is the tread radius, and β is the phase offset angle that is inventively to be determined (if given in degrees, as is done subsequently, this is to be expanded by 2pi/360°).

Since the tread radius varies over the width of the tire, the phase offset is subsequently given not as the arc length, but rather as the angle (β) about the axis of rotation of the tire.

Figure 2:
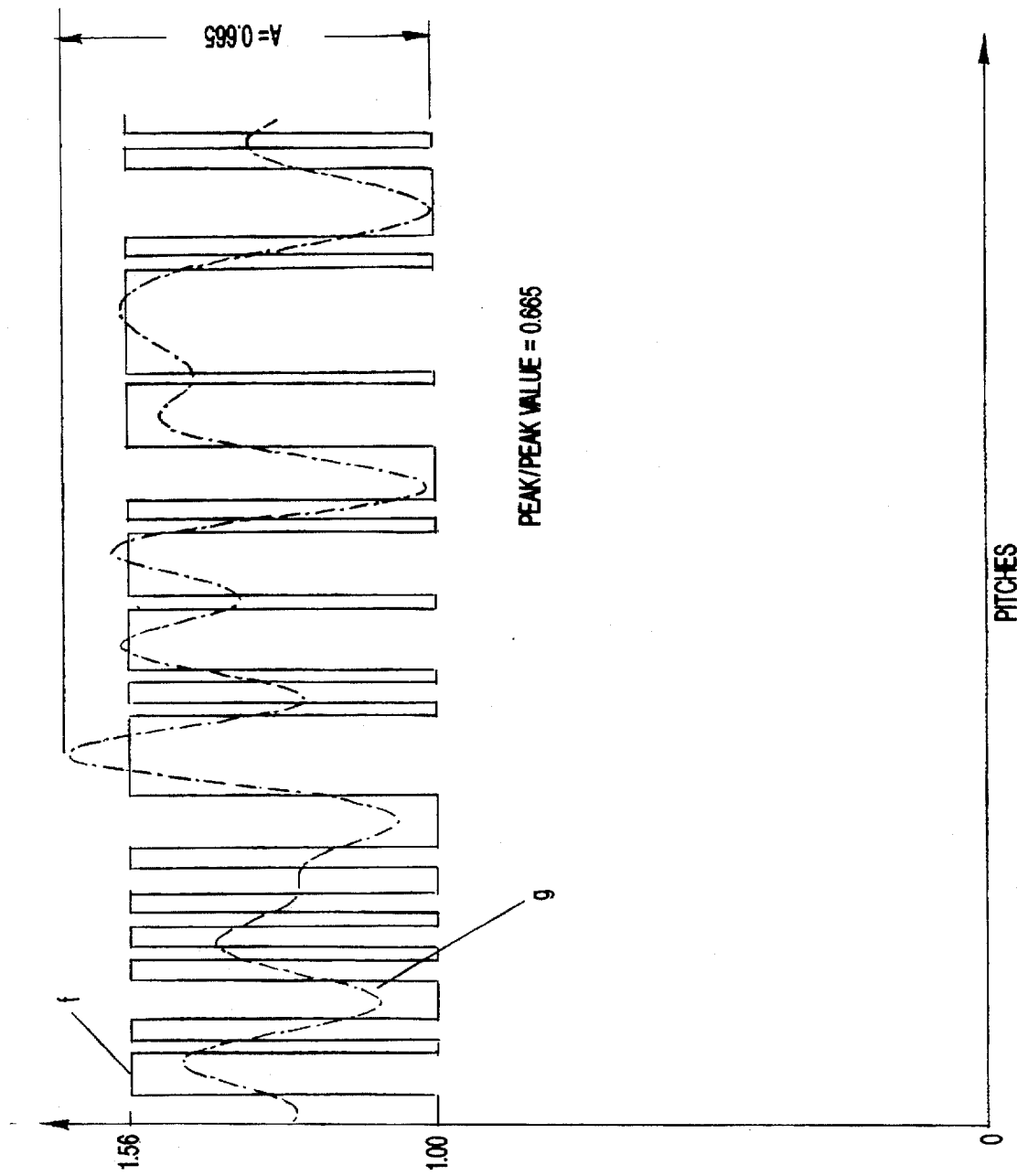
FIG. 2 shows the function "f" and the representation "g" of one inventive pitch sequence, as well as an explanation of the term "peak/peak value"

FIG. 2 shows how the function "f", which is shown by a thin solid line, is to be determined from a pitch sequence, in this case that previously listed: First of all, for the pitch length "1", an abscissa unit of measurement is fixed arbitrarily, here with regard to the prescribed pattern edge 2.12 mm.

The graph begins at the position 0/1.0 and from there extends horizontally to the right by twice the abscissa unit of measurement since the first two pitches have the length 1.00.

Continuing now toward the right, the graph then jumps to 1.56, the length of the pitch having the length 11211, and from there extends horizontally in conformity with the two successive pitches of this length by the amount 2×1.56×2.12 mm=6.61 mm.

The graph then returns to 1.00 in conformity with the fifth pitch, which has the length "1". Since this pitch doesn't immediately repeat itself, the graph remains in a horizontal section only one time for the abscissa unit of measurement 2.12 mm.

In conformity with the sixth pitch, which has the length "2", the graph then jumps to 1.56 and remains there, since this is also not a repetitive location, only one time for the 1.56 times the abscissa unit of measurement, in other words 3.31 mm.

In conformity with the seventh to the ninth pitches, which repeat the length "1", the graph then returns to 1.00 and remains there for three times the abscissa unit of measurement, in other words 6.36 mm. This process is repeated until the sequence has been covered exactly one time.

The peak/peak value of the function (the distance between the extremes) is exactly equal to the difference between the greatest and the smallest pitch length, in this example 0.56.

The representation "g" of the function "f" for x=10 is indicated in dot-dashed lines. Generally, the peak/peak value of the representation is greater than that of the function, which is also true here, namely A=0.665.

In this embodiment, no analogous graph is required for the pitch sequence of the other tread half since both pitch sequences are supposed to be identical.

Figure 3:
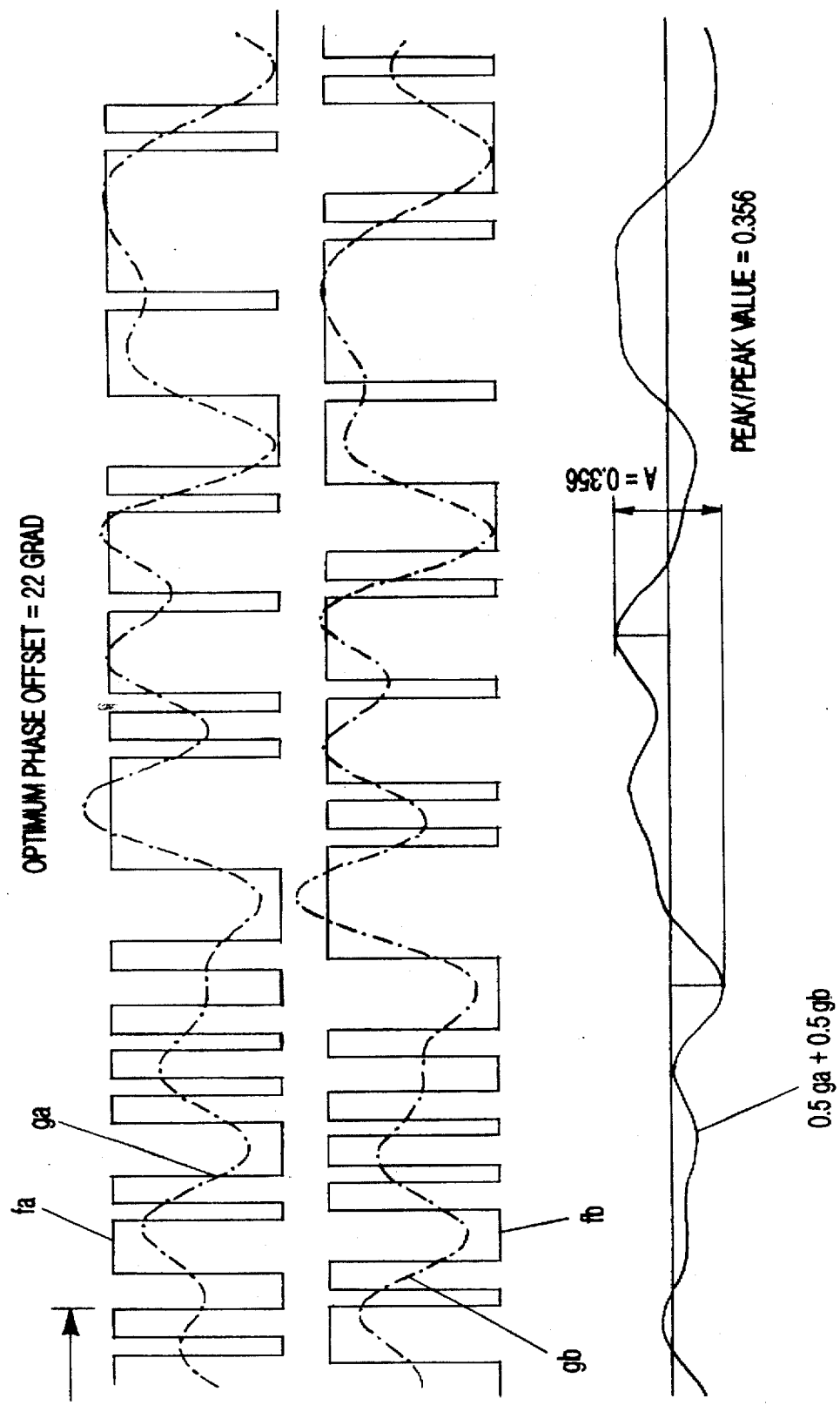
FIG. 3 is a superimposition or summation of two, in this example identical, pitch sequences at a phase offset of 22°.

The two, in this embodiment identical, graphs of the representation ga ("a" symbolizes one tire half and "b", symbolizes the other tire half) and gb are now phase offset relative to one another with respect to the pitches by an angle β. The upper part of FIG. 3 shows the two graphs at a phase offset of β=22°. Since the two tread halves have the same width, and are also not distinguishable with respect to the groove geometry and the pitch sequence, the importance or weighting factor of both is the same, in other words 0.5. In conformity therewith, the combined representation gz is:

$$gz = 0.5\ ga + 0.5\ gb$$

The graph of the combined representation gz is illustrated in the bottom portion of FIG. 3.

A diagram such as illustrated in FIG. 3 can be plotted for any desired phase offset β; for FIG. 3, only β=22° was used because under this phase offset in the combined representation gz the smallest peak/peak value, namely 0.356, is established. Thus, a reduction of 46.5% is achieved over the phase offset β=0°, where the peak/peak value, due to the fact that the two pitch sequences are identical, is equal to the peak/peak value of each individual representation "g", in other words exactly 0.665.

Figure 4:
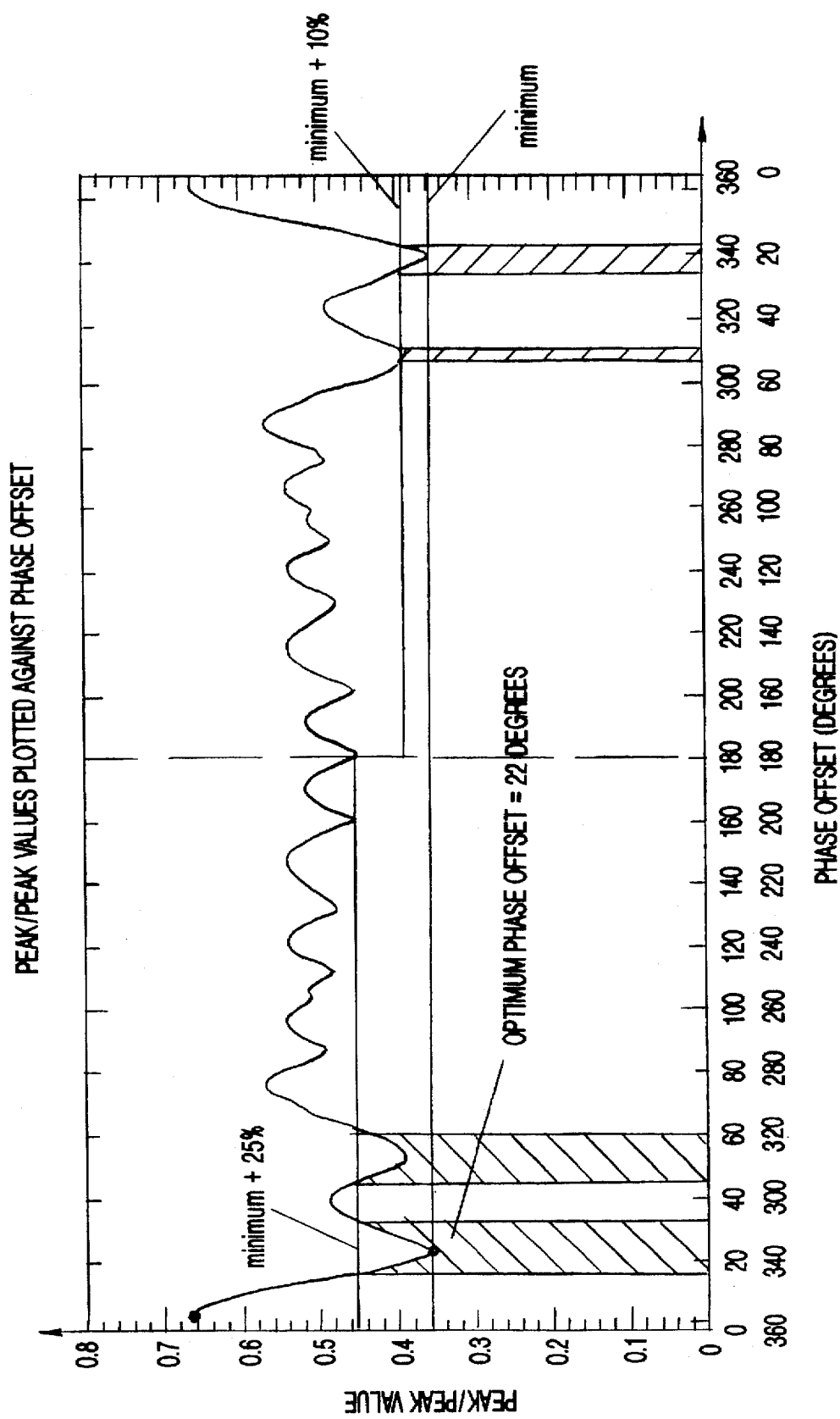
FIG. 4 is a graph of the peak/peak value of the superimposition as a function of the selected phase offset.

FIG. 4 is intended to show how the peak/peak value of the combined representation gz acts as a function of the selected phase offset β. One can see that in addition to the absolute minimum at 22°, a nearly similar small relative minimum also results at 52°. This is important because frequently a phase offset of greater than 30°, as has been recognized by the present inventors, leads to a more favorable subjective rating of the noise.

The present invention as claimed is intended to cover not only the phase offset β in which the peak/peak value of the combined representation gz has achieved its absolute minimum, but also all of the ranges where the peak/peak value is at most 25% greater; in the illustrated embodiment, where the absolute minimum is 0.356, the range that is intended to be covered is therefore 1.25×0.356=0.445. This limitation is indicated in the left half of the drawing. (Due to the fact that the two pitch sequences are identical, the right half is a mirror image of the left, and therefore actually superfluous.) As can be read off from the abscissa, the angular ranges of from 14.5° to 31.5° and from 45° to 60° fall under this protective range definition; these two ranges are shown with a crosshatching that rises toward the right.

Pursuant to a preferred embodiment of the present invention, the phase offset β is selected in such a way that the actual peak/peak value, in other words the distance between the extremes of the combined representation gz that can be seen in FIG. 3, is at most 10% greater than the absolute minimum; the corresponding limits for this example are therefore 1.1×0.356=0.392, and are indicated in the right half of FIG. 4. As can be read off from the abscissa, this corresponds to the angular ranges of 17.5° to 26° and from 50° to 54°.

The second exemplary embodiment will now be described in detail in conjunction with FIGS. 5 to 8.

Figure 5:
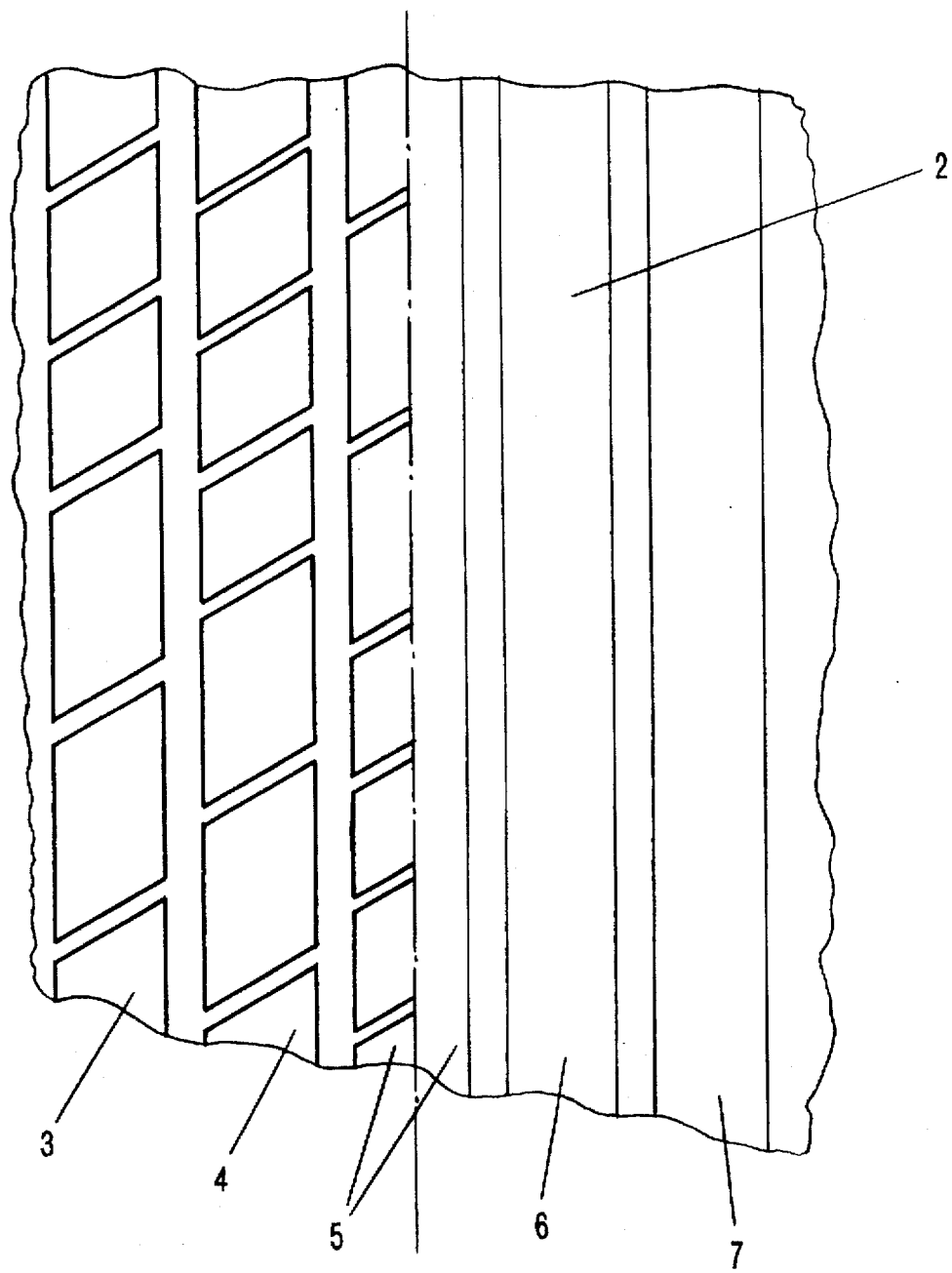
FIG. 5 is a view of a portion of another tread profile.

FIG. 5 shows a portion of a projection of a tread 2 that is profiled in an arrow-shaped manner. The profiling is symmetrical to the dot-dash center line; due to the symmetry, only the left hand side of the tread has been shown in detail.

The profiling is divided into 5 rows of blocks, which are numbered from 3 to 7 as viewed from left to right. In the central row of blocks 5, the transverse grooves extend in a V-shaped manner, whereas in the remaining rows 3, 4, 6 and 7 the transverse grooves extend linearly at an angle of 60° relative to the circumferential direction of the tire.

With regard to a good handling characteristic, in other words a rapid and precise reaction to steering movements, the shoulder blocks have a larger division than do the inner blocks; in the two rows of shoulder blocks 3 and 7, the same pitch sequence is utilized as is known from the first embodiment, and has 60 pitches. The illustration of the pertaining function and representation can be found in FIG. 2. In contrast, in the inner rows of blocks a pitch sequence having 70 pitches is utilized, but the same maximum pitch length ratio and also only two pitch lengths are used.

Figure 6:
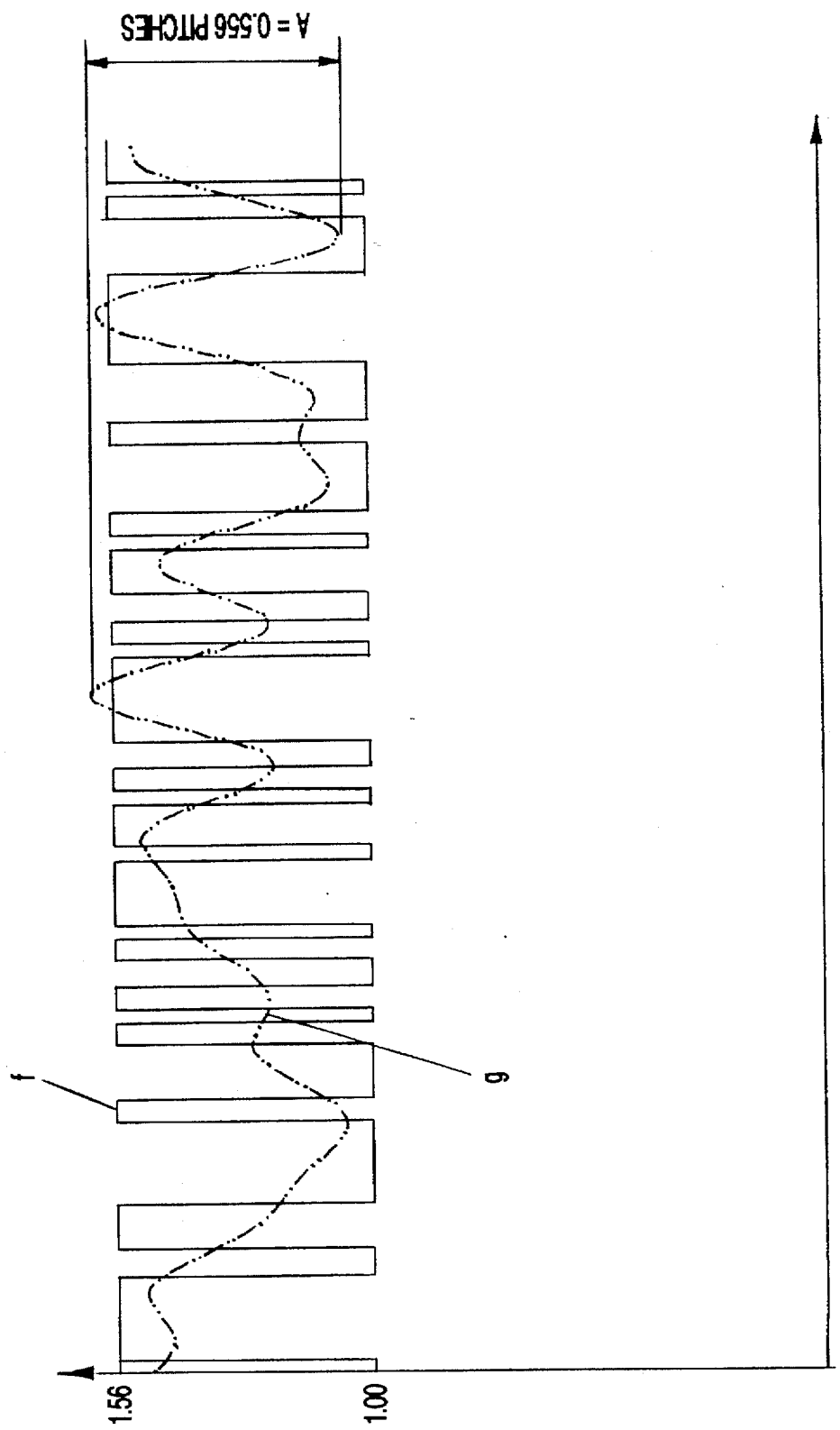
FIG. 6 is a diagram of the function "f" similar to FIG. 2 for a further inventive pitch sequence.

In a manner similar to FIG. 2, FIG. 6 shows for the 70 pitch sequence the function "f" in a thin solid line, and in a dark dot-dashed line the pertaining representation "g" for x=10.

The aim of the present invention is to provide good phase offset angles. To facilitate understanding, the following illustration is limited to the search of the two best phase offsets. To begin with, one arbitrarily chooses which of the positive rows will be viewed as the variant and will serve as a reference point for the two angles that are to be determined; the intermediate rows 4 and 6 that are disposed between the central row 5 and the shoulder rows 3 and 7 are to be viewed as invariant.

Figure 7:
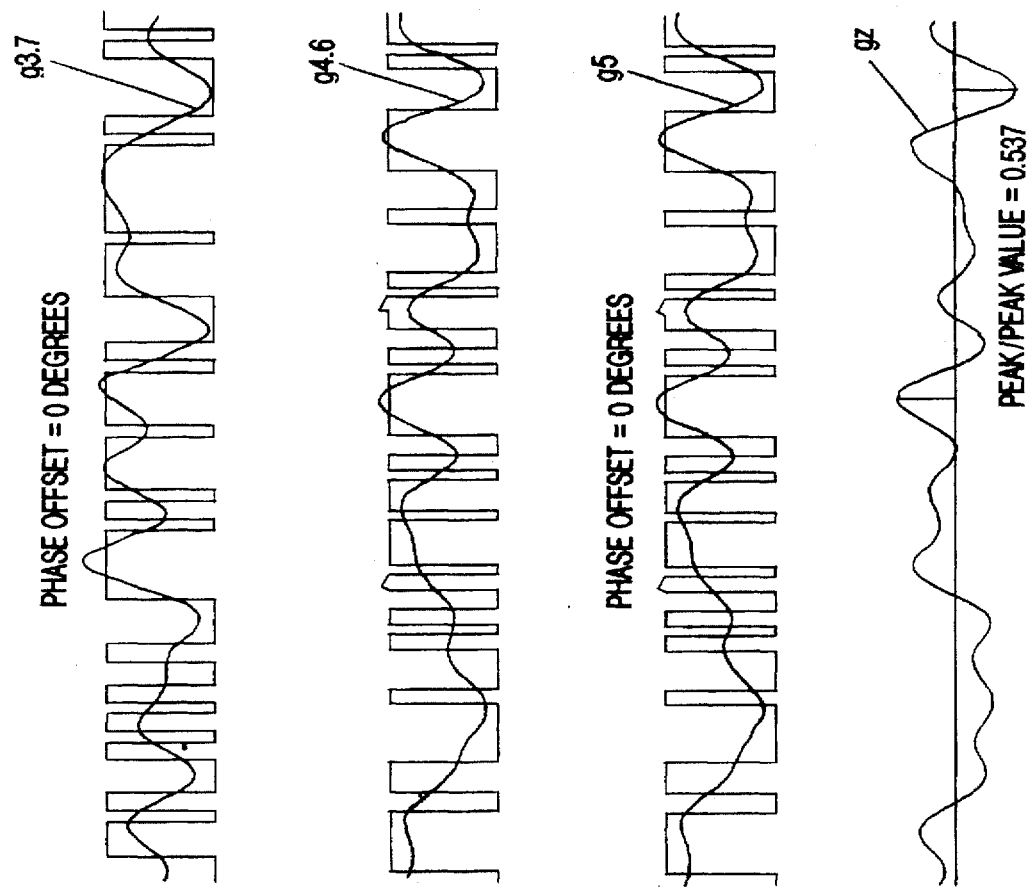
FIG. 7 shows the superimposition of all three representations to a combined representation gz at a phase offset of 0.

The top half of FIG. 7 shows the function f3.7 and representation g3.7 of the shoulder rows 3 and 7 in the phase offset 0° and a function f4.6 and representation g4.6 of the intermediate rows 4 and 6. The phase offset of the central row 5 is here also 0°.

In conformity with the proportion to the tread width, the two upper representations g3.7 and g4.6 are each weighted 0.4, and the representation g5 of the central row 5 is weighted 0.2. At the phase offset 0°/0° the sum gz of the combined representation results is shown at the bottom of FIG. 7. The peak/peak value thereof is 0.537.

FIG. 8 is analogous to FIG. 7, although the upper and the lower ones of the three representational diagrams are shown in the phase offset were the peak/peak value of the combined representation gz is minimal; nevertheless, the distance between the extremes could be lowered to 0.265. For this purpose, the phase relationship of the shoulder pitch sequence relative to the intermediate pitch sequence (indicated by an arrow thereabove) is shifted by 1° to 30°, and the phase relationship of the central pitch sequence relative to the intermediate pitch sequence (again indicated by an arrow) is shifted by 88°.

A tire 1 optimized in this manner not only introduces particularly small vibrations into the wheel suspension, but in addition due to the phase equality between the rows 3 and 7 and between the rows 4 and 6 the steering is practically entirely free of any vibration caused by the tires.

The present invention is, of course, in no way restricted to the specific disclosure of the specification and drawings, but also encompasses any modifications within the scope of the appended claims.

What we claim is:

1. In a vehicle tire having a profiled tread with at least two axially adjacent tread parts, on the periphery of which are arranged pitches of at least two different pitch lengths, with successive pitches in each tread part forming a pitch sequence, wherein said pitch sequences of said at least two tread parts are offset relative to one another by a phase offset beta, the improvement wherein:
    said phase offset beta is defined by:
        a) obtaining for each of said tread parts a mathematical function from said pitch sequence thereof by:
            1) taking a random pitch of said pitch sequence as the first pitch, the next following pitch as the second pitch, the next following pitch as the third pitch, and so on for all remaining pitches of said pitch sequence, and
            2) plotting a graph of pitch length on the ordinate versus pitch on the abscissa for the entire pitch sequence such that, in the interval between zero and the end of the first pitch, the graph has an ordinate value constantly equal to the length of the first pitch, in the interval between the end of the first pitch and the end of the second pitch, the graph has an ordinate value constantly equal to the length of the second pitch, and so on for all remaining pitches of said pitch sequence, wherein the graph defines the mathematical function;
        b) defining a representation of each of said functions as a synthesis in proper amplitude and phase-relation of a harmonic analysis of said function from a first to an xth harmonic with x being an integer between 8 and 14;
        c) for a given phase offset beta, plotting a graph of a combined representation of said functions and then reading from the ordinate of said graph the distance between absolute extremes of said combined representation, wherein said combined representation equals a summation of the representations with each representation weighted by a weighting factor, with the sum of the weighting factors equaling 1;

d) repeating step c) at a plurality of phase offset betas and for each of said phase offset betas plotting on a graph the distance between the absolute extremes of the combined representation versus the phase offset beta; and e) from the graph of step d), determining a minimum distance between the absolute extremes and reading off a phase offset beta value that corresponds to a distance between absolute extremes which is at most 10% greater than said minimum distance, wherein this read-off value defines said phase offset beta.

2. A vehicle tire according to claim 1, wherein x is an integer between 9 and 11.

3. A vehicle tire according to claim 1, wherein all of said pitch sequences of said tread parts are, with the exception of their phase offset, identical.

4. A vehicle tire according to claim 1, wherein at least two axially outermost rows of said tread parts have the same pitch sequence and are phase offset relative to one another by at most 2°.

5. A vehicle tire according to claim 4, wherein a non-centrally disposed row of one half of said tread is paired with a row of said tread of the other half of said tread, with said pairing being such that said paired rows have the same pitch sequence and are practically phase identical relative to one another.

6. A vehicle tire according to claim 1, wherein said phase offset beta is greater than 30°.

7. A method comprising:
a) providing at least two pitch sequences with each pitch sequence including a successive pitches of at least two different pitch lengths, said at least two pitch sequences being either the same sequence or different sequences, and obtaining for each of said pitch sequences a mathematical function from said pitch sequence thereof by:
1) taking a random pitch of said pitch sequence as the first pitch, the next following pitch as the second pitch, the next following pitch as the third pitch, and so on for all remaining pitches of said pitch sequence, and
2) plotting a graph of pitch length on the ordinate versus pitch on the abscissa for the entire pitch sequence such that, in the interval between zero and the end of the first pitch, the graph has an ordinate value constantly equal to the length of the first pitch, in the interval between the end of the first pitch and the end of the second pitch, the graph has an ordinate value constantly equal to the length of the second pitch, and so on for all remaining pitches of said pitch sequence, wherein the graph defines the mathematical function;

b) defining a representation of each of said functions as a synthesis in proper amplitude- and phase-relation of a harmonic analysis of said function from a first to an xth harmonic with x being an integer between 8 and 14;

c) for a given phase offset, plotting a graph of a combined representation of said functions and then reading from the ordinate of said graph the distance between absolute extremes of said combined representation, wherein said combined representation equals a summation of the representations with each representation weighted by a weighting factor, with the sum of the weighting factors equaling 1;

d) repeating step c) at a plurality of phase offsets and for each of said phase offsets plotting on a graph the distance between the absolute extremes of the combined representation versus the phase offset; and e) from the graph of step d), determining a minimum distance between the absolute extremes and reading off a phase offset value that corresponds to a distance between absolute extremes which is at most 10% greater than said minimum distance; and f) producing a vehicle tire having a profiled tread such that the profiled tread defines said at least two pitch sequences, the pitches of a respective pitch sequence being arranged on a respective tread part of the profiled tread, the tread parts being axially adjacent, wherein said pitch sequences of said tread parts are offset relative to one another by a phase offset which is equal to the read-off value.

8. A method according to claim 9, which includes the step of realizing said phase offset in a vulcanization mold by appropriate displacement of an upper half of said mold relative to a lower half of said mold.

9. A method according to claim 7, wherein x is an integer between 9 and 11.

10. A method according to claim 7, wherein all of said pitch sequences of said axial tread parts are, with the exception of the phase offsets thereof, identical.

* * * * *